E. K. BAKER.
SEMIWOOD WHEEL CONSTRUCTION.
APPLICATION FILED DEC. 31, 1919.
1,368,421.
Patented Feb. 15, 1921.
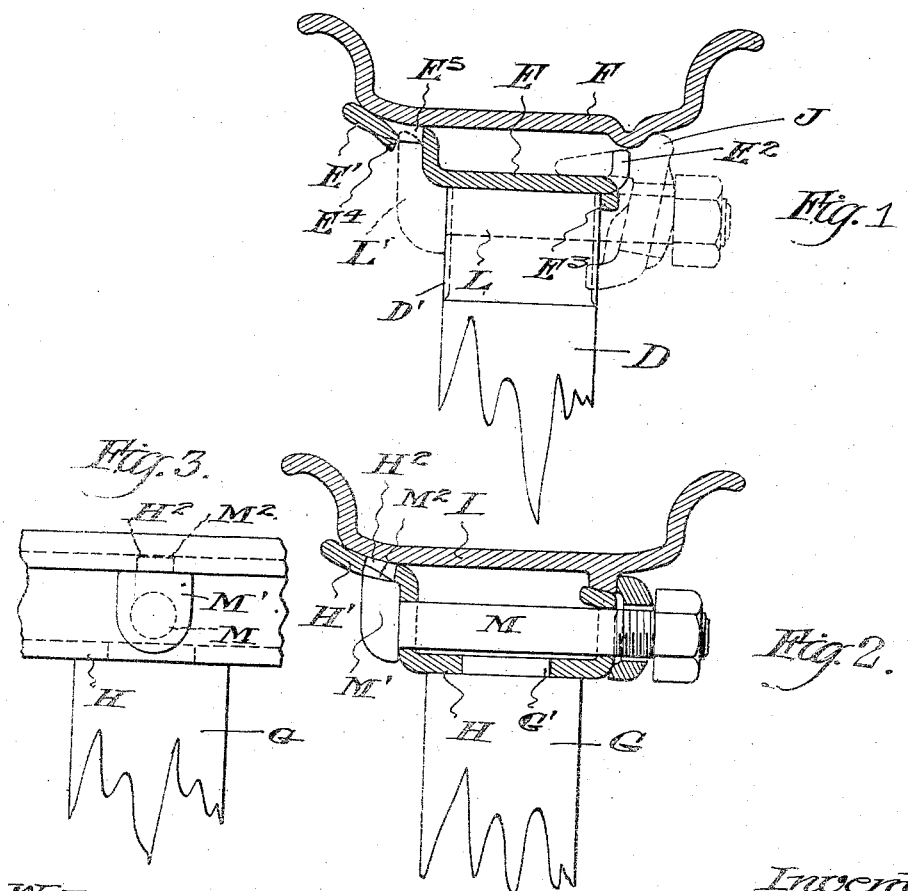

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL CONSTRUCTION.

1,368,421.

Specification of Letters Patent. Patented Feb. 15, 1921.

Application December 31, 1919. Serial No. 348,559.

*To all whom it may concern:*

Be it known that I, ERLE KING BAKER, a citizen of the United States, and a resident of Chicago, county of Cook, and State of Illinois, have invented a certain new, useful, and Improved Semiwood Wheel Construction, of which the following is a specification.

My invention relates to motor vehicle wheels of the kind that are used with pneumatic tires and demountable tire carrying rims. This application, in addition to its general adaptations, has special reference to improvements in semiwood wheels.

The fundamental invention of this application is disclosed and broadly claimed in my co-pending application, Serial No. 342,187, filed December 3, 1919 (see Figs. 7 and 9 thereof); and this application relates to certain modifications of the structure therein disclosed; including also the specific structure shown in Fig. 9, of but not claimed in my co-pending application, Serial No. 341,188, filed December 3, 1919.

The fixed rim of a wheel adapted to carry a demountable rim generally is equipped with clamping bolts and with clamping lugs coacting therewith to hold the demountable rim in place on the wheel. The semi-wood wheel has no metal or wood felly as distinguished from its fixed rim for its spokes coact directly with its fixed rim. The clamping bolts are an annoying factor for oftentimes they break and must be replaced which means that they cannot well be permanently fastened to the fixed rim, and if not fastened they are apt to become loose and be lost off the wheel.

The object of this invention is to provide a construction in which the clamping bolts while not metallically united with, or otherwise permanently secured to, the fixed rim shall nevertheless be substantially permanent parts thereof in the sense that they shall be firmly interlocked therewith and while not being difficult of removal with a proper tool shall be so held as to prevent their accidental dislodgement from the wheel.

A further object of the invention is to provide a fixed rim and bolt interlockment which enables the use of the bolt, not only in its normal association with the wedge or clamping lug, but also as a part coacting with the fixed rim to fasten in place on the latter the outer end of one of the wooden spokes of the wheel.

The nature of my invention and its details will be readily understood upon reference to the accompanying drawings, which form a part of this specification, and in which: Figures 1 and 2 are cross-sectional views illustrating two different typical semi-wood-wheel fixed rims of my invention, equipped with clamping bolts which are interlocked therewith according to this present invention;—and Fig. 3 is a rear side elevation of the parts shown in Fig. 2.

Preliminarily, the parts depicted in the drawings may be identified as follows, it being understood that a complete semi-wood wheel of the kind with which the invention is specially concerned comprises a number of radial wooden spokes in combination with a circular fixed metal rim mounted directly on the ends of the spokes, and a circular tire-carrying demountable rim which is mounted upon the fixed rim;—and it being also understood that Figs. 1 and 2 are fragmentary views showing the fixed and demountable rims in cross-section, in each case showing the end of one spoke at the point where is engages the fixed rim.

In Fig. 1 the wooden spoke is marked, D; and in Fig. 2 is marked G. Similarly, in Fig. 1 the fixed rim is marked E and in Fig. 2, H. The demountable rim in Fig. 1 is marked F; in Fig. 2, I. The fixed and demountable rims of the different figures are not identical; my purpose being to indicate that this present invention is applicable to the fixed rims of channel-like cross section and of all those kinds or types which have over-hanging back flanges that carry their demountable rims; for it is with these back flanges that my present invention is concerned, as hereinafter described. The back flange of the fixed rim shown in Fig. 1 is marked, E'; that of Fig. 2 is marked H'. The height of the upstanding, or radially outstanding, part of the back flange, as shown varies from the general type of the fixed rim; is governed by the distance between the cylindrical or base portions of the fixed and demountable rims, in each case. This distance is least in the case of Fig. 1. The fixed rim, E, of Fig. 2 is specially characterized by an outstanding front flange, E², notched at intervals to receive the wedge lugs. (See wedge lug, J, indicated by dotted lines in Fig. 2). At each such notch the base portion of the fixed rim preferably is pressed down to form an over-hanging lug, E³, which coacts with the front side of the spoke, D, to prevent relative displacement in one direction. Preferably, the ends of the spokes, D, are protected by metal ferrules, particularly in the case of Fig. 1 where the tail or fulcrum part of the wedge lug must find its bearing against the spoke, D. The ferrules also serve the useful purpose of preventing the splitting of the spokes under the stress of the clamping bolts, L, which they contain. The clamping bolt, M, of Fig. 2 finds its place within the confines of the fixed rim itself and in that case the attachment between the spoke, G, and the part, H, may be a simple spoke tenon, G', as shown. Each clamping bolt is provided with a head on the back of the wheel; the threaded end of the bolt being presented at the front or outer side to receive the nut by which the wedge or clamping lug is secured against the demountable rim. The head, L', of the spoke, L, engages not only the back of its spoke but also the back of its fixed rim, E, and the head of the bolt, M, engages the back of the fixed rim, H.

It will be seen that in each case the head of the clamping bolt is engaged with a part which holds it against the pull of the nut on the bolt; in other words, the bolt cannot move outwardly. It remains too secure to the bolt so that it cannot move inwardly; that is, transversely across the fixed rim toward the back or inner side of the wheel. This I accomplish by interlocking the bolt head with the back flange or part of the fixed rim; meaning at a point rearward of the part which limits the forward or outward movement of the bolt. To accomplish this I utilize the outward springiness or resilience of the back flange portion to permit the bolt head to enter its interlocked relation therewith.

Considering the wheel as a whole, it is my practice to drive in one bolt at a time (a wheel usually has six of such bolts) and under such condition the back flange springs away far enough to allow the bolt to enter. Once the bolt head has arrived at position shown in Fig. 1, the back flange springs back into place thus interposing the part, E⁴, as a stop which engages the back surface of the bolt head, L, and positively prevents its escape from the fixed rim.

As shown, the bolt head, L', (in this case having a long upward extension) is made to engage in a stop opening, E⁵, and against a stop portion, E⁴, pressed down from the back flange, E', of the rim, E.

In the case of Fig. 1, this prevention of the escape of the bolt, once it is driven into place, causes the bolt head to become a fixed part which directly coacts with the opposed flange of the fixed rim (see E³) and to effectually lock the spoke and the fixed rim together.

The interlockment illustrated in Fig. 2 is like unto that shown in Fig. 1, comprising a snap-in portion, or tooth, M², formed on the head, M', and which snaps into the hole, or slot, H², provided therefor in the overhanging back flange, H', of the fixed rim, H. In this case the interlockment of the bolt of the fixed rim serves only to secure the bolt in the rim, and has no function with respect to the spoke.

In all cases the bolt head has a broad flat bearing against the inner periphery of the back flange, as best serves to prevent rotation of the bolt under the turning stress of the threaded nut.

If a bolt breaks, or the threads thereon are stripped, so that it is necessary to remove the bolt and put in a new one, it is comparatively an easy matter to spring back the flange of the fixed rim far enough to permit the driving out of the bolt; but obviously the interlockment here provided positively prevents any accidental dislodgement or loss of the clamping bolts; a feature of general importance, and of special importance in cases such as Fig. 1 where the headed bolt is relied upon as a spoke-securing part.

Having thus described my invention, I claim as new and desire to secure by Letters Patent:

1. The herein described improvement comprising a fixed rim of channel-like cross-section, having an over-hanging back flange portion, in combination with a headed clamping bolt, and said back flange portion being provided with a shoulder adapted to snap into engagement with the back of the head of the bolt for the purpose specified.

2. The herein described improvement in semi-wood wheels that consists in a fixed rim of channel-like cross-section having an over-hanging back flange portion, in combination with spokes in coaction with the fixed rim, clamping bolts provided in certain of said spokes and having heads engaged with the backs thereof, and said back flange portion of said fixed rim having a shoulder portion for each bolt, adapted to snap into engagement with the back of the head thereof, thus in each case simultaneously securing the bolt and the spoke.

In testimony whereof, I have hereunto set my hand this 29th day of December, 1919.

ERLE KING BAKER.